(12) United States Patent
Bruce et al.

(10) Patent No.: US 6,970,890 B1
(45) Date of Patent: Nov. 29, 2005

(54) METHOD AND APPARATUS FOR DATA RECOVERY

(75) Inventors: Ricardo H. Bruce, Union City, CA (US); Rolando H. Bruce, S. San Francisco, CA (US)

(73) Assignee: BiTMicro Networks, Inc., Fremont, CA (US)

( * ) Notice: Subject to any disclaimer, the term of this patent is extended or adjusted under 35 U.S.C. 154(b) by 34 days.

(21) Appl. No.: 09/819,515

(22) Filed: Mar. 27, 2001

Related U.S. Application Data

(60) Provisional application No. 60/257,536, filed on Dec. 20, 2000.

(51) Int. Cl.[7] ............................................. G06F 12/00
(52) U.S. Cl. .............................. 707/202; 707/2; 707/8; 707/10
(58) Field of Search ................................ 707/200, 202, 707/204, 2, 8, 10; 714/1, 8, 22, 48, 15; 711/161, 711/162; 340/3.31; 713/1, 2

(56) References Cited

U.S. PATENT DOCUMENTS

| | | | | |
|---|---|---|---|---|
| 5,239,640 | A | * | 8/1993 | Froemke et al. ................ 714/1 |
| 5,602,987 | A | * | 2/1997 | Harari et al. ................... 714/8 |
| 5,664,096 | A | * | 9/1997 | Ichinomiya et al. ........... 714/48 |
| 5,758,054 | A | * | 5/1998 | Katz et al. ..................... 714/22 |
| 5,822,251 | A | | 10/1998 | Bruce et al. ............ 365/185.33 |
| 5,956,743 | A | | 9/1999 | Bruce et al. ................. 711/103 |
| 6,000,006 | A | | 12/1999 | Bruce et al. ................. 711/103 |
| 6,170,066 | B1 | * | 1/2001 | See ............................. 714/22 |
| 6,665,813 | B1 | * | 12/2003 | Forsman et al. ............... 714/15 |

* cited by examiner

*Primary Examiner*—Safet Metjahic
*Assistant Examiner*—Etienne P LeRoux
(74) *Attorney, Agent, or Firm*—Shabneez Kotadia; Stephen Uriarte; Mikio Ishimaru

(57) ABSTRACT

A method for recovering data in a storage device is provided in which information related to a first data structure is defined with a plurality of copies of a second data structure and the information related to the first data structure is rebuilt using the plurality of copies of the second data structure upon corruption thereof.

31 Claims, 8 Drawing Sheets

METHOD AND APPARATUS FOR DATA RECOVERY

CROSS-REFERENCE TO RELATED APPLICATION(S)

This application claims the benefit of U.S. Provisional Patent Application Ser. No. 60/257,536 filed Dec. 20, 2000.

TECHNICAL FIELD

The present invention relates generally to computer systems and more specifically to data storage devices.

BACKGROUND ART

Modern storage devices are susceptible to data loss or corruption in the event of a power interruption or loss during operation. One approach in minimizing or preventing data loss in such systems is to employ non-volatile memory, such as flash memory. However, employing non-volatile memory does not entirely eliminate the possibility of data loss or corruption caused by power interruptions. The storage path in the storage device is not completely non-volatile (i.e., data is moved from one location to another and during transit may be stored in non-volatile buffers). Moreover, write operations may be interrupted while in progress, corrupting the data being written or the data being replaced. When such an event occurs to device configuration data, such as remapping, wear-leveling, and directory information, the result can be catastrophic since large amounts, if not all, of the data stored in the device may not be recoverable upon subsequent power-up and re-initialization.

Accordingly, a need exists for an apparatus and method of data recoverability that avoids or minimizes data corruption or loss, including corruption or loss of configuration data or data selected for storage (host data) in a storage device during a power interruption.

DISCLOSURE OF THE INVENTION

The present invention includes a method of using base block copies to define the location of selected data structures used for file system management. It uses at least two of the base block copies to provide redundancy so that in the event one of the copies cannot be located or verified, the other copy can be used to rebuild the defective base block copy. Upon rebuilding the copy, one of the copies is used as the primary table to find the other file management structures, such as a recovery, control, address translation, remapping and wear-leveling tables and the like.

The present invention also includes a method of writing to each base block copy so that in the event of power interruption at worst only one of the copies can be corrupted, such as when the interruption occurs during a write to one of the copies, and the storage device can differentiate which copy has the most recent data.

In a further embodiment, the present invention also includes a method for preserving data stored in the file management structures even when a write transaction being performed on one of the structures is interrupted. The present invention uses a pre-erased recovery block to ensure the integrity of data stored in the file management structures by writing first to the recovery block prior to writing to the targeted file structure. In case of power loss in the middle of a write to flash memory, the invention uses the pre-write recovery block to recreate the intended state of the updated flash memory block. If power loss occurs during a write operation to the recovery block, the flash memory to be written into is still in its uncorrupted prior state. If no power loss occurs, then the recovery block is updated and the scheduled write to the flash memory is completed. Moreover, the recovery block is always pre-erased before usage and the original write/update being performed before power loss will be tried again in the course of normal firmware processing when the E-Disk comes up again.

Currently, this data recoverability feature applies to all structures used for controlling memory functions, such as bad block remapping, wear leveling, and the like. By providing a recovery block, caching host data, and writing critical information to the recover block prior to writing the data to a memory store, such as a flash device coupled to a direct-memory access (DMA) engine can recover data that might have otherwise been lost in the event of a power interruption is preserved. Preferably, one recovery block is used for every DMA engine used.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
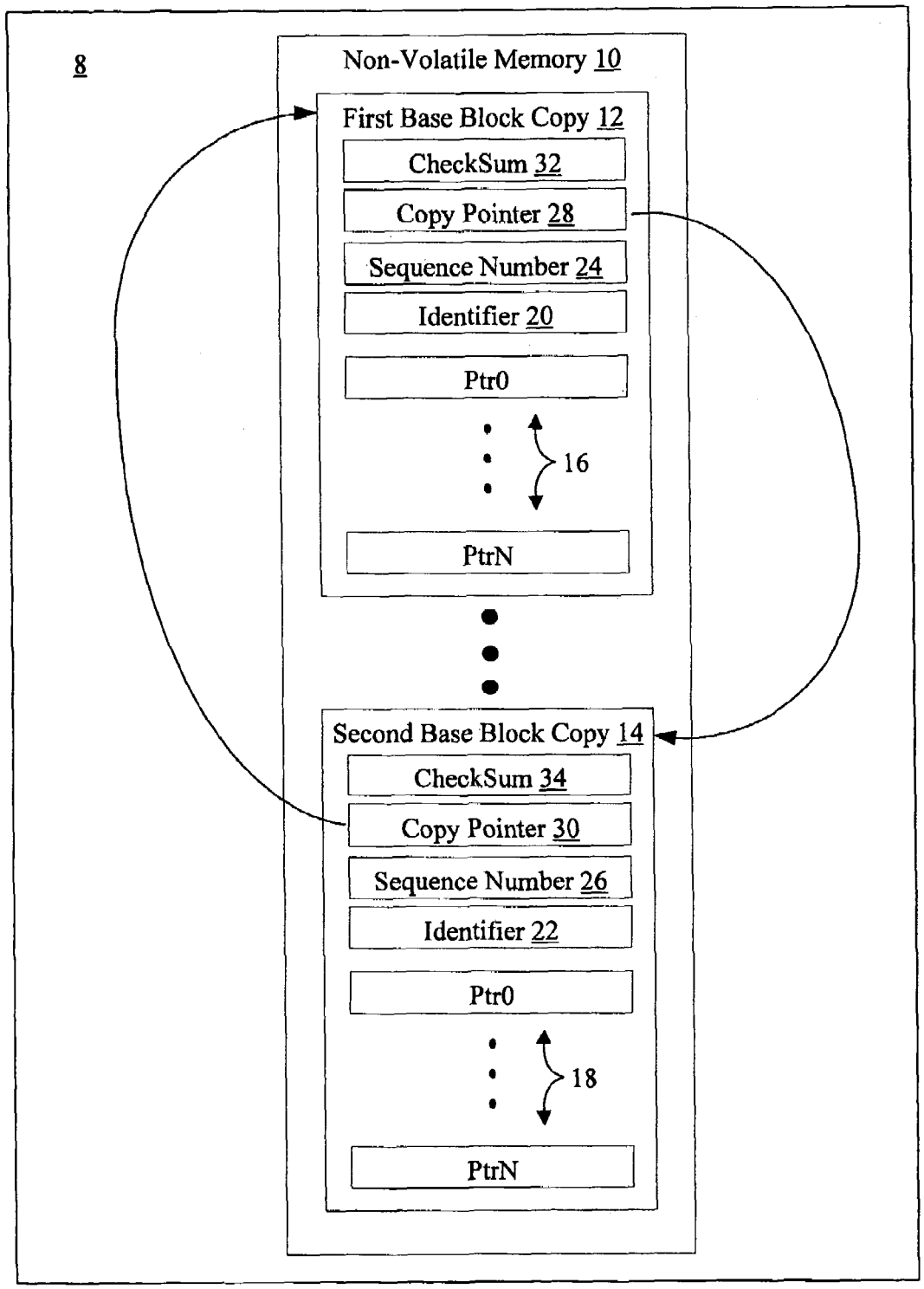
FIG. 1 is a block diagram describing the composition of the two base block copies of the present invention.

Referring now to FIG. 1, the present invention is used with a storage device and maintains two copies of location data inside a non-volatile memory 10, which are referred to as a first base block copy 12 and a second base block copy 14 and each respectively corresponding to device configuration-related data. Each base block copy includes a plurality of copy pointers Ptr0 through PtrN 16 and 18 respectively, which point to the base block and other storage device structures. The contents of a base block copy and the storage device structures form part of the "file system" of the storage device 8. Hence, a base block copy enables the storage device 8 to determine where the file system is located in the storage device 8. The device structures may in turn hold pointers to other device structures (such as remap and wear-leveling tables), configuration data, and/or recovery information.

Each base block copy 12 and 14 also includes respective block identifiers 20 and 22, respective sequence numbers 24 and 26, respective copy pointers 28 and 30, and respective checksums 32 and 34. Block identifiers 20 and 22 are simply labels identifying their respective block of data as a base block copy and are referred to herein as "footprints". This permits the storage device 8 to search non-volatile memory 10 for a base block copy during start-up. Sequence numbers 24 and 26 are incremented each time their respective base block copy is updated, representing the number of times a base block copy has been updated with new information. The copy pointers 28 and 30 designate the location of another base block copy. In the example shown in FIG. 1, two base block copies 12 and 14 are used with first copy pointer 28 pointing to second base block copy 14 and second copy pointer 30 pointing to first base block copy 12.

Having more than one copy of a base block provides redundancy, thereby rendering the information held in a base block recoverable in the event of data corruption (either loss or scrambling) caused either by an inherent defect in non-volatile memory 10, a power interruption or loss, or equivalent event. Prior to shipping the storage device 8, the device is configured for use by writing a copy of one of the base blocks 12 or 14 to the first defect-free ("good") block available in the non-volatile memory 10. The other copy is then written in another location in non-volatile memory 10 and their respective copy pointers 28 and 30 updated so that they point to the other copy. A first checksum 32 is then generated for first base block copy 12 and written into a defined location in first base block copy 12. Then a first sequence number 24 is generated and stored in first base block copy 12. After this is accomplished, a second checksum 34 is generated for the second base block copy 14 and saved therein. A second sequence number 26 is also generated and then stored in the second base block copy 14. Sequence numbers 24 and 26 should be the same since both copies have been updated the same number of times. The storage device 8 will check the sequence numbers of both base blocks copies 12 and 14 for a match prior to using a base block copy. If the sequence numbers do not match, the storage device 8 will use the base block copy having the latest sequence number.

During operation, the storage device 8 will generate a new sequence number each time a base block copy is updated. After generating the sequence number and saving the number in the base block copy in use, the other base block copy is updated with the same information, ways. If power is interrupted or lost during the update of the base block copy in use and the base block copy update is in progress but not completed, the other base block copy may be used instead of the corrupted base block to startup the storage device 8 and to recover the corrupted base block copy.

If power interruption occurs after the successful update of the base block copy in use but before the completion of the update of the base block copy not in use, the base block copies will have difference sequence numbers. The base block copy that was successfully updated prior to the power interruption will have a sequence number that is later than the sequence number of the base block copy that was in the progress of being updated. Assuming the interruption did not render the base block copy with the latest sequence number unreadable, the storage device 8 will select the base block copy with the latest sequence number since it was the copy with the latest update.

Figure 2:
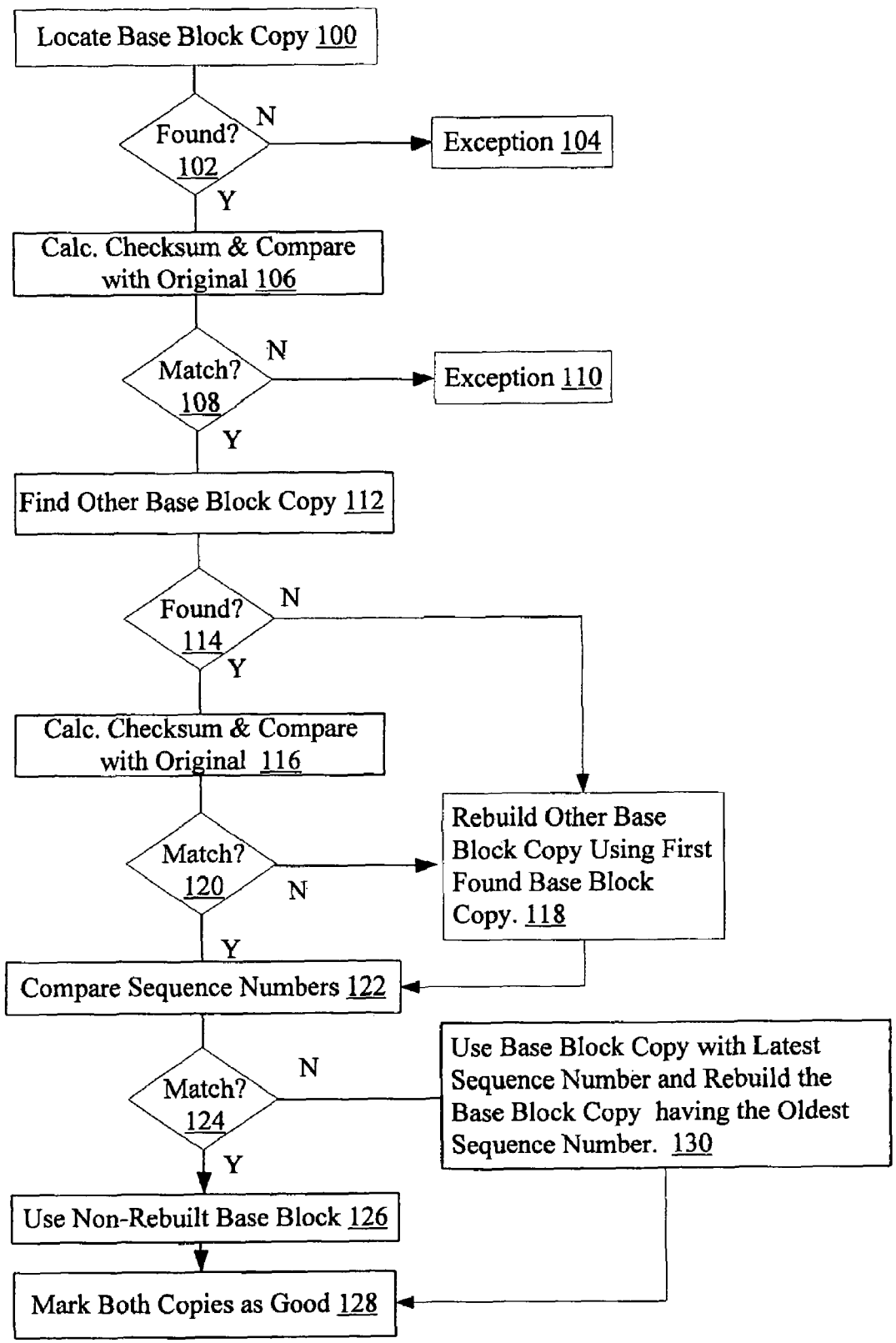
FIG. 2 is a process describing the data recoverability features of the present invention that are implemented during its start-up routine.

Referring now to FIG. 2, therein is shown a process describing the data recoverability of the present invention that is implemented during its start-up routine.

Upon start-up and after its initial configuration, the storage device, through firmware, attempts to locate a base block copy in a Locate Base Block Copy block 100 that it can read successfully from non-volatile memory. If a base block copy is not found in a Found? block 102, the firmware triggers an exception routine in an Exception block 104, such as triggering an external signal source to indicate an error.

Otherwise, a checksum is calculated using the contents of the base block copy that were successfully located and read in a Calculate Checksum and Compare with an Original block 106. The calculated checksum is then compared with the stored checksum in the Calculate Checksum and Compare with an Original block 106 and if they match in a Match? block 108, the copy pointer for the base block is used to find the other base block copy in a Find Other base Block Copy block 112. If they do not match in the Match? block 108, an exception routine in an Exception block 110 is triggered.

If the other base block copy is not found or read successfully in the Found? block 114, then the storage device attempts to rebuild the other base block copy in a Rebuild Using other Base Block Copy block 118. Otherwise, a checksum is calculated and compared with the checksum stored in the other base block copy in a Calculate Checksum & Compare with an Original block 116. If they do not match in a Match? block 120, the storage device attempts to rebuild in the Rebuild Using Other Base Block Copy block 118. If the calculated checksum matches in the Match? block 120, then the sequence numbers of both base block copies are compared in a Compare Sequence Numbers block 122. If both sequence numbers match in a Match? block 124, then the non-rebuilt base block copy is used in a Non-rebuilt Base Block block 126 to find the remaining operating system structures. In a preferred embodiment, the non-rebuilt base block found is used.

Both copies are then marked as known good blocks in a Mark Both Copies as Good block 128. The base block copy that is not used is updated whenever the pointers are updated in the base block copy that is in use, providing two updated base block copies that may be relied upon should one of the copies become corrupted (not shown).

If the sequence numbers do not match in the Match? block 124, the storage device uses the base block copy having the latest sequence number to recover the data in the other base block copy in the Use base Block Copy with latest Sequence Number and Rebuild the Base Block Copy Having the Oldest Sequence Number block 130 and upon doing so successfully, marks both base block copies as known good base blocks in the Mark Both Copies as Good block 128.

The ability to verify or recover data held in a base block copy not only preserves the integrity of that data but also preserves the integrity of data contained in structures that are pointed to by the data preserved in a base block copy. For example, the present invention is well suited for use in an operating system that uses multi-level data structures that are arranged in a tree architecture. The root structure functions as a directory to structures below it and in turn, the structures below the root structure may function as directories to other structures, or if the structures do not have any structures below it, may hold data instead.

Employing a tree structure comprised of multi-level directory structures provides many advantages. It permits the structures to be moved in memory, providing wear-leveling and remapping flexibility. It also can be inherently sized to the minimum write size granularities imposed by certain memories. These advantages are well suited for memory stores that are comprised of flash memory because flash memory is write-cycle limited and has a minimum write size granularity fixed at the block rather than the byte level. Hence, each directory structure can be defined to have a size of one block, facilitating the transfer of the directory structures to different block locations in the flash memory when needed such as when providing wear-leveling and remapping functionality to the storage device.

FIG. 2 shows that although a tree structure has the disadvantage of failing catastrophically in the event that the data in the root data structure is corrupted, using the base block copy data recoverability and preservation method disclosed above provides data recoverability and preservation of the root data structure. Only one base block copy is used as the root data structure but the other base block copy operates as a recovery copy should the base block copy used as a root data structure fail.

Figure 3:
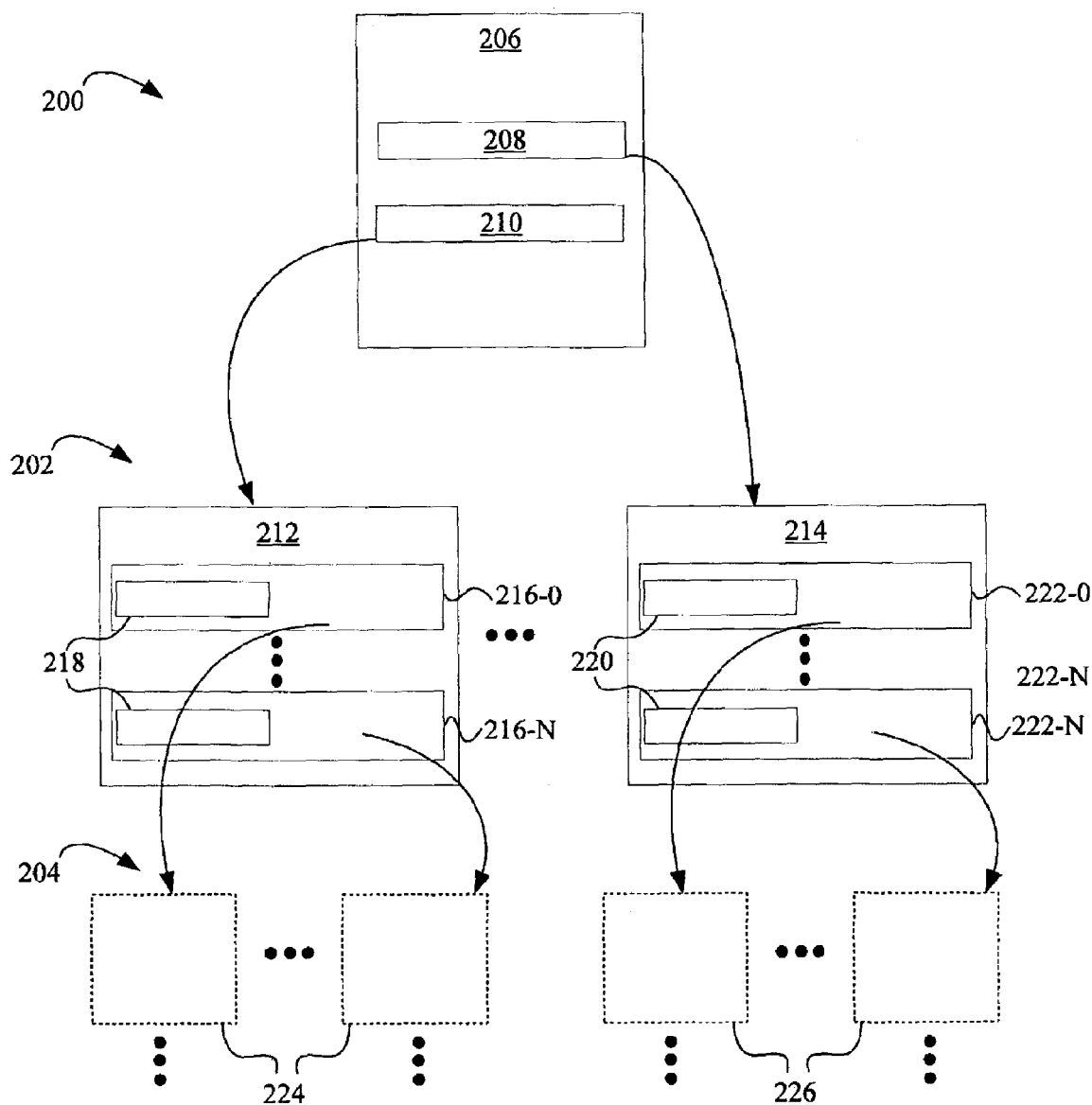
FIG. 3 is a further embodiment of the present invention that may be used to preserve or render any corrupted data in the data structures recoverable.

Referring now to FIG. 3, therein is shown a further embodiment of the present invention that may be used to preserve or render the data in corrupted data structures recoverable. The top level, or Root Level 200, is where a Known Good Base Block Copy 200 is stored. The present invention uses a recovery structure at the level below the Root Level 300, hereinafter referred to as the First level 202. The recovery structure renders the data structures below the Root Level 200 recoverable in the event of a power loss or interruption. Thus, besides having a data recovery/preservation solution for the Root Level 200, the present invention may also include a data recovery/preservation solution for data held by structures below the root structure.

To minimize confusion, only a single base block copy, a Known Good Base Block Copy 206, is shown in FIG. 3 although more than one copy may be used in the manner disclosed herein to obtain data recoverability functionality. When two base block copies are used, either copy may be used as the root directory as long as the selected copy has been verified as containing valid data as disclosed in one embodiment of the present invention above. In addition, data stored in each base block copy that are used for recovery, such as checksum, footprint, and the like, are not included in FIG. 3 to further minimize obscuring the present invention.

The Known Good Base Block Copy 206 contains a Recovery Block Pointer 208 and a Control Block Pointer 210 that enable the storage device's firmware to determine the current locations of a Recovery Block 214 and a Control Block 212, respectively. Each structure has a plurality of pages, Control Block Page 0 through N designated as 216-0 through 216-N, and Recovery Block Page 0 through N designated as 222-0 through 222-N with each page having a copy of its respective block's physical block address (PBA), Control Block Pointer 218 and Recovery Block Pointer 220 respectively. This permits the firmware to validate the contents of each page by comparing the PBA in the page with the structure's pointer in the base block copy used as root directory. Additional, error detection solutions may be used on a page-by-page basis, such as an Error Correcting Code (ECC) and the like.

Figure 4:
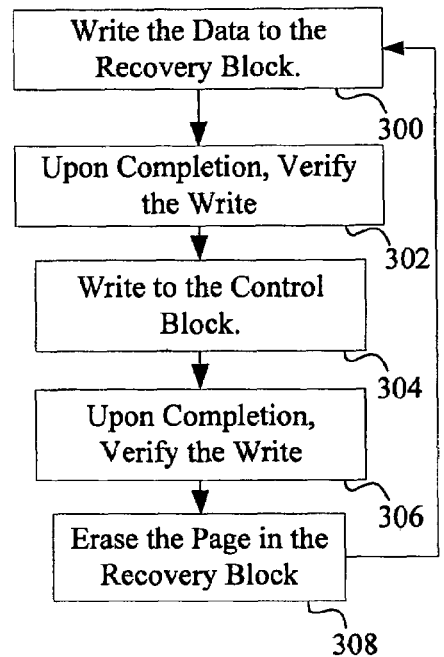
FIG. 4 is a process flow describing a data recoverability/preservation method suitable for use with storage devices that use the recovery block as disclosed in FIG. 3 in accordance with another embodiment of the present invention.

Referring now to FIG. 4, therein is shown a process flow describing a data recoverability/preservation method suitable for use with storage devices that use the recovery block as disclosed in FIG. 3. For each scheduled write operation targeted for a selected directory structure, the data to be written will first be written to the recovery block in a first block 300 and verified in a second block 302. The selected directory structure may be any of the structures that are used by the storage device as part of its operating system and that is to be updated by the scheduled write. For example, referring to FIG. 2, the selected directory structure may be the control block 212 or any one of the other directory structures shown.

Upon verification of the write operation to the recovery block in the second block 302, the scheduled write is then performed on the selected directory structure in a third block 304. Upon completion of the write in the third block 304, the write is verified in a fourth block 306. The recovery block is then erased in a fifth block 308 and the process is repeated. Should a power interruption occur, upon start-up and initialization the present invention checks the recovery block for any valid recovery data and if so, enters a data recovery routine as will be described in FIG. 6.

Figure 5:
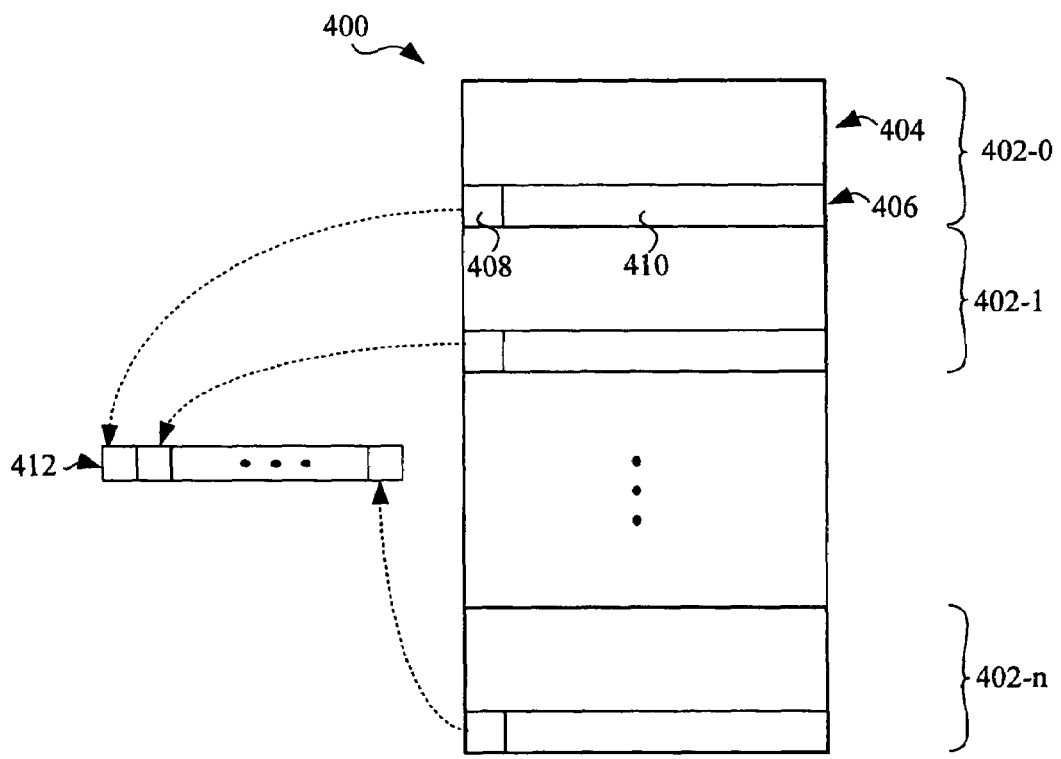
FIG. 5 is a block diagram of a recovery block in accordance with further embodiment of the present invention.

Referring now to FIG. 5, therein is shown a block diagram of a recovery flash memory block 400 in accordance with the preferred embodiment of the present invention. The recovery flash memory block 400 is comprised of a plurality of flash memory block pages 402-0 through 402-$n$ comprising a data portion 404 and a bookend portion 406. The size of the data portion 404 is determined by the flash memory block size that in turn is defined by the storage device's operating system and flash memory media. In one embodiment, the data portion 404 is 512 bytes in length and the bookend portion 406 is 16 bytes in length. The data portion 404 is intended to contain recovery data, while the bookend portion 406 is used to store a statistics data portion 408 and an ECC information portion 410. The statistics data portion 408 is preferably one byte in size and is used in combination with other statistics data portions 408 from other pages in the plurality of flash memory block pages 402-0 through 402-$n$ to form a statistics record 412 for the entire recovery flash memory block 400. Reserving one byte in every bookend for use as the statistics data portion 408 leaves 15 available bytes, which are used to store the ECC information portion 410 for the page.

Currently, there are three possible flash memory block sizes available although this is not intended to limit the present invention in any way. The current block sizes are: 4, 8 and 16 Kilobytes (KB), respectively. The recovery flash memory block 400 shown in FIG. 5 is defined to have a size of 4 KB. This permits seven (7) flash memory block pages 402-0 through 402-6 to be stored in the recovery flash memory block 400. Obviously, the larger the size of the flash memory block page 402 used, the greater the number of flash memory block pages 402 for a given page size that may be stored within the recovery flash memory block 400. For example, if the size of the recovery flash memory block 400 used is 8 KB or 16 KB, then the maximum number of flash memory block pages 402-0 through 402-$n$ that can be defined for the recovery flash memory block 400 is 15 or 31 pages, respectively. Moreover, a greater number of flash memory block pages 402-0 through 402-$n$ stored also increases the number of statistics data portions 408 that may be combined to form the statistics record 412 for the entire recovery flash memory block 400.

When writing to the recovery flash memory block 400 (or another directory structure), the data is written in block size increments. Data to be written is stored in the statistics data portion 408 of each page. In addition, the PBA of the recovery flash memory block 400 is written in the statistics data portion 408, and ECC information is written into the ECC information portion 410 of the bookend portion 406 that corresponds to the same flash memory block page 402-n of the statistics data portion 408 used to store the data that was used to generate the ECC information.

When erasing the recovery flash memory block 400 (or another directory structure), the statistics data portion 408 and the ECC information portion 410 are filled with pre-defined values, such as "FF" (hex) and zeros, respectively. If these values are found in every statistics data portion 408 and ECC information portion 410 defined in the recovery flash memory block 400, then the recovery flash memory block 400 will be treated as completely erased.

Figure 6:
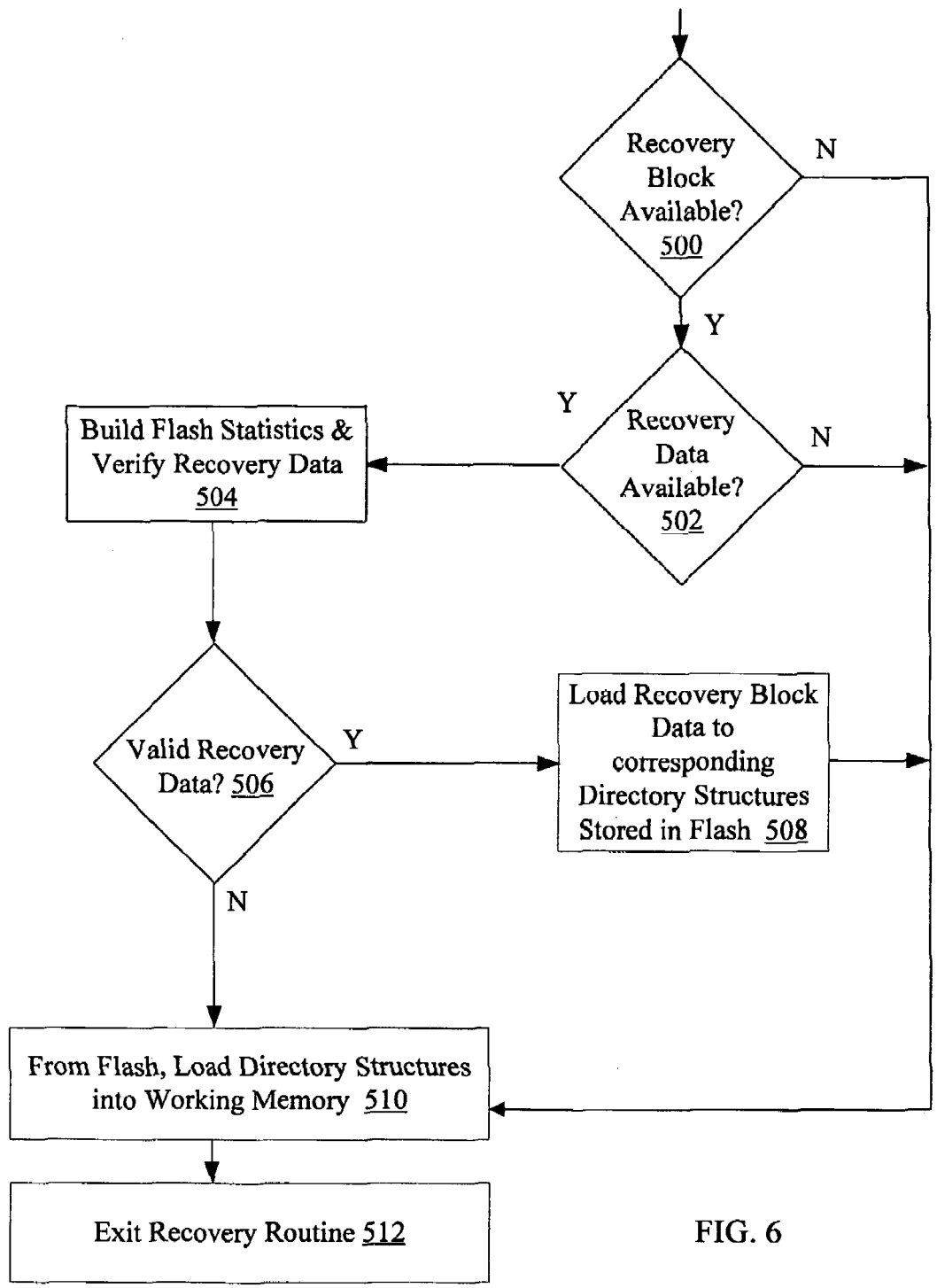
FIG. 6 is a process flow describing a method of preserving selected data for recovery in the event of a power interruption or loss in accordance with another embodiment of the present invention.

Referring now to FIG. 6, therein is shown a process flow describing a method or preserving selected data for recovery in the event of a power interruption or loss in accordance with another embodiment of the present invention.

The device enters into an initialization routine, which includes an attempt to locate the recovery block in the Recovery Block Available? block 500. If the recovery block is located, the device will determine whether it contains valid recovery data in the Recovery Data Available? block 502.

If the recovery block does not contain valid recovery data, then the storage device loads configuration data stored in flash memory or equivalent non-volatile memory to a second memory location for working purposes in the From Flash, Load Directory Structures into Working Memory block 510, which is preferably in the form of DRAM. The storage device then proceeds to normal operation by exiting the routine in an Exit Recovery Routine block 512. If the recovery block contains recovery data in the Recovery Data Available? block 502, the storage device attempts to verify the recovery data in the Valid Recovery Data? block 506 by building flash memory statistics from the data found and verifying the data contained therein. If verification is not successful, configuration data, which is stored in non-volatile memory such as flash memory, rather than the recovery data is written to the second memory location in the From Flash, Load Directory Structures into Working Memory block 510 and the storage device enters normal operation by exiting the recovery routine in an Exit Recovery Routine block 512.

If valid recovery data is found in the Valid Recovery Data? block 506, the storage device loads recovery block data to the corresponding directory structures stored in flash memory, or equivalent non-volatile memory in the Load Recovery Block Data to Corresponding Directory Structures Stored in Flash 508. The storage device then loads the configuration data stored in the flash memory to a second memory location for working purposes, which is preferably in the form of DRAM, in the From Flash, Load Directory Structures into Working Memory block 510. The storage device then proceeds to normal operation by exiting the recovery routine in the Exit Recovery Routine block 512.

Figure 7:
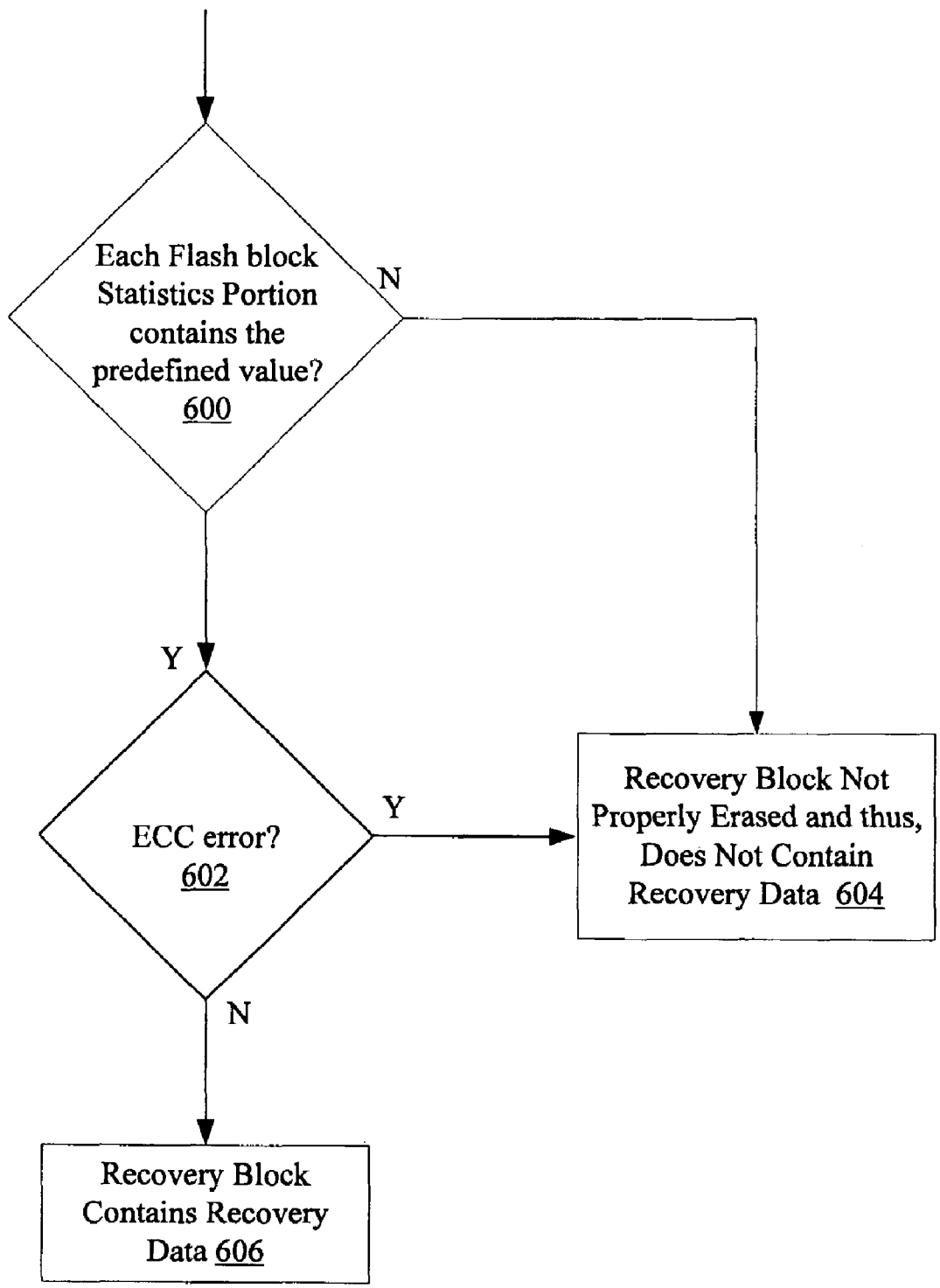
FIG. 7 is a process flow describing a method of determining whether a recovery block contains recovery data in accordance with an embodiment of the present invention.

Referring now to FIG. 7, therein is shown a process flowchart describing a method of determining whether a recovery block contains recovery data in accordance with another embodiment of the present invention. Two actions are taken to make this determination. First, every statistics data portion defined in every bookend in the flash memory block is checked to determine whether it contains the value "FF" or an equivalent predefined value in the Each Flash Blk Statistics Portion Contains the Predefined Value? block 600. If so, the ECC data in each bookend is used to check for an ECC error in the ECC Error? block 602. If no error is found, then the recovery block is deemed to have received recovery data in the Recovery Block Contains Recovery Data block 606.

If at least one statistics data portion does not contain an "FF" value, then the directory structures stored in flash memory are loaded into working memory in a Recovery Block Not Properly Erased and thus, Does Not Contain Recovery Data block 604 since this condition indicates that the recovery block was not completely erased and in effect, was not properly updated with recovery data.

Similarly, if at least one ECC field does results in an ECC error, then the write to the recovery block was not properly completed, and is deemed to have corrupted the recovery data in the recovery block in the Recovery Block Not Properly Erased and thus, Does Not Contain Recovery Data block 604.

Figure 8:
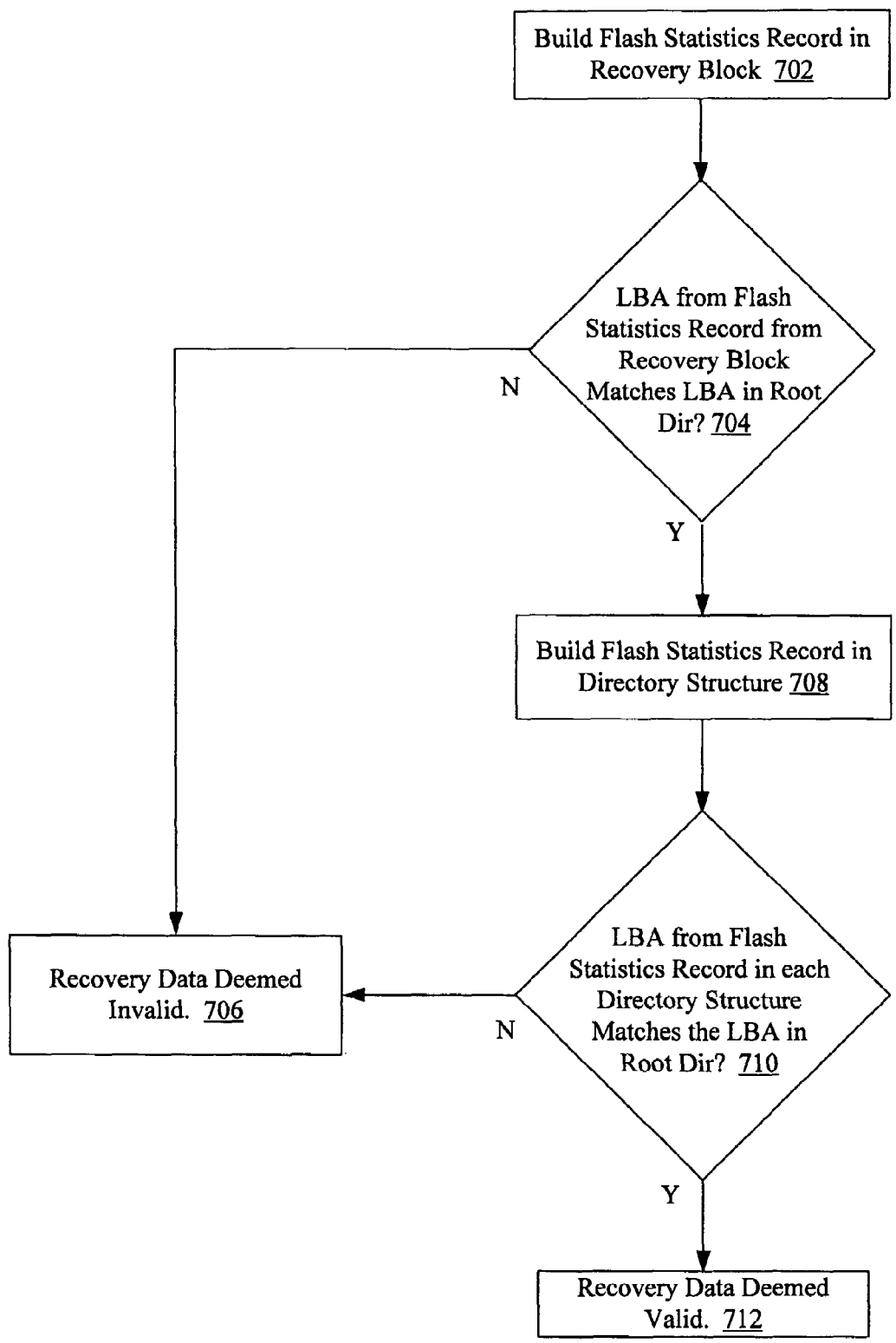
FIG. 8 is a process flowchart describing a method of verifying recovery data in accordance with another embodiment of the present invention.

Referring now to FIG. 8, therein is shown a flowchart describing a method of verifying recovery data in accordance with a further embodiment of the present invention. If recovery data is found in the recovery block, each page is verified by building the statistics record and combining every statistics data portion in the block shown by a Build Flash Statistics Record in Recovery Block block 702. The statistics record includes the logical block address (LBA) of the recovery block, wear-leveling information, and the like. The LBA of the flash memory statistics record and the LBA in the root directory are compared in the LBA from Flash Statistics Record from recovery Block matches LBA in Root Dir? block 704, and if the LBA does not correspond to the PBA of the recovery block, the recovery block data is considered invalid in a recovery data Deemed Invalid block 706.

If the flash memory statistics record of the LBA and the LBA found in the root directory match, a flash memory statistics record for each directory structure is then built by combining each flash memory statistics portion in each bookend in a Build Flash Statistics Record in Directory Structure block 708. The LBA from the directory structure flash memory statistics record is then compared with the LBA in the root directory in the LBA in an LBA from Flash Statistics Record in each Directory Structure Matches the LBA in Root Dir? block 710. If the LBA's match, the recovery data is deemed valid in the Recovery Data Deemed Valid block 712.

In both instances, the LBA address defined for the directory structures and the recovery block are obtained from the root directory, which in the present invention is provided by a base block copy.

Figure 9:
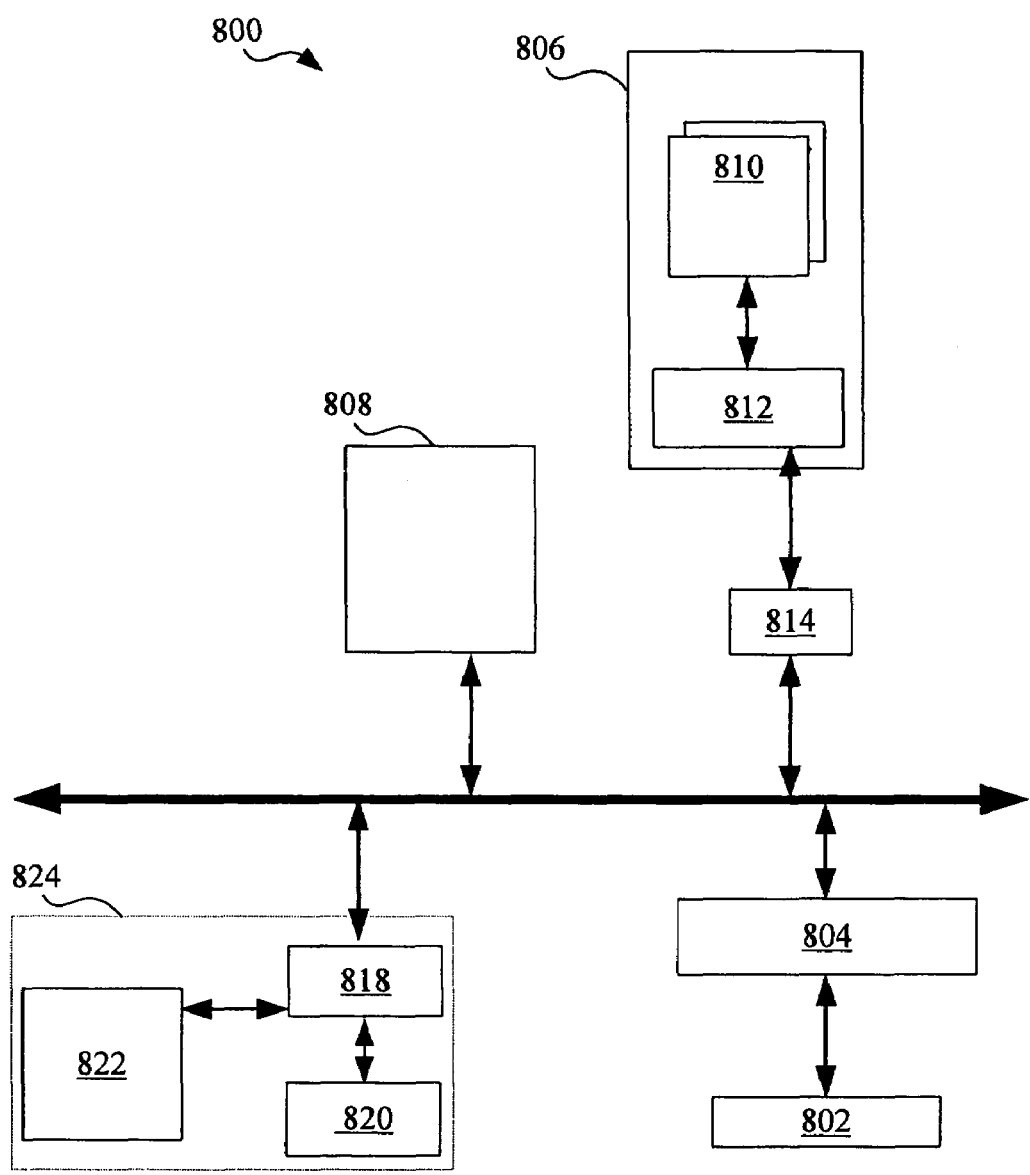
FIG. 9 is a block diagram of a storage device with the recovery features of the present invention.

Referring now to FIG. 9, therein is shown a block diagram of a storage device 800 having the data recovery features described herein. The storage device 800 is coupled to a host 802 through a peripheral interface 804, such as SCSI, Fibre Channel, ATA, IDE, and the like, permitting the host 802 to perform storage operations on the storage device 800, such as write and read operations. The storage device 800 is shown having a Memory A 806, a Memory B 808, a system bus, a memory bus, a local processor 818 and associated circuitry. In addition, a Processor Circuit 824, a Local Processor Memory 822, a ROM 820, and their general interaction with the storage device 800 appear in the block diagram but are not described to avoid overcomplicating the herein disclosure. An example of the system architecture shown in FIG. 9 is described in U.S. Pat. No. 5,822,251. In one embodiment, the Memory A 806 is comprised of at least one bank of NAND Flash memory 810 and a flash memory buffer circuit 812, which is coupled to a memory controller, such as a DMA controller 814. The Memory A 806 is intended for use as the device's primary storage memory and more than one set may be used to increase capacity and/or performance. In one embodiment, one DMA controller is used for every set implemented.

The Memory B 808 is preferably comprised of DRAM (or its equivalents, such as SDRAM, RDRAM, etc.) and is used as a read/write ("storage") cache to Memory A 806. The Memory B 808 is controlled by at least one DMA memory controller (not shown) although more than one may be used to increase performance. Two DMA controllers (not shown) are used and provided using the local processor, which is a RISC processor having two embedded DMA controllers. The local processor is designated with model number 405 and is available from Motorola, Inc, of Phoenix, Ariz.

The conduit between the peripheral interface 804 is a simplified representation of a peripheral bus and may include switches, routers, and network devices but are not shown to avoid complicating the herein disclosure. For example, if the peripheral interface is implemented using a fibre channel interface then at least one port provided by a switch would be part of the conduit between the peripheral interface and the host.

The data selected for recoverability includes all device configuration data that change during operation, such as state, remapping and wear-leveling information, control block information, and the like, although the range or type of data structures is not intended to limit the invention in any way.

The above steps are interrupt-driven and do not necessarily occur sequentially (or in any particular order). For instance, some structures may have already been built early on before the Base Block search, or maybe built within the middle of the search process (or even after) depending upon numerous conditions.

While the invention has been described in conjunction with a specific best mode, it is to be understood that many alternatives, modifications, and variations will be apparent to those skilled in the art in light of the above description. Accordingly, it is intended to embrace all such alternatives, modifications, and variations that fall within the spirit and scope of the included claims. All matters hither-to-fore set forth or shown in the accompanying drawings are to be interpreted in an illustrative and non-limiting sense.

What is claimed is:

1. A method for recovering data in a storage device comprising:
providing a first base block copy having a first sequence number, a first copy pointer and a first checksum;
providing a second base block copy having a second sequence number, a second copy pointer and a second checksum;
defining in the storage device information related to a first data structure within a plurality of copies of a second data structure, wherein the plurality of copies includes the first base block copy and the second base block copy; and
rebuilding the information related to the first data structure using the first base block copy upon corruption of the second base block copy.

2. The method as claimed in claim 1 wherein: the storage device performs a write operation; and defining the information related to a first data structure includes updating the plurality of copies of the second data structure prior to the write operation.

3. The method as claimed in claim 1 wherein defining the information related to a first data structure includes differentiating which of the plurality of copies of the second data structure has the most recent data.

4. The method as claimed in claim 1 wherein defining the information related to a first data structure includes selecting each of the plurality of copies of the second data structure so at most one of the plurality of copies of the second data structure can be corrupted.

5. The method as claimed in claim 1 wherein: the first data structure has an intended state; and rebuilding the information related to the first data structure includes using one or more of the plurality of copies of the second data structure to rebuild the intended state of the first data structure after the corruption of one of the plurality of copies of the second data structure.

6. The method as claimed in claim 1 wherein: the first data structure has a plurality of file management structures; and rebuilding the information related to the first data structure includes using one or more of the plurality of copies of the second data structure to find other file management structures after data corruption of one of the plurality of copies of the second data structure.

7. The method as claimed in claim 1 wherein the storage device includes pre-erased recovery blocks; and defining the information related to a first data structure includes writing the plurality of copies of the second data structure to the pre-erased recovery blocks.

8. A method for recovering data in a memory comprising:
providing a first base block copy having a first sequence number, a first copy pointer and a first checksum;
providing a second base block copy having a second sequence number, a second copy pointer and a second checksum;
defining a memory location of a data structure within a plurality of base block copies the plurality of base block copies including the first base block copy and the second base block copy; and
rebuilding the memory location of the data structure by using the first base block copy if the first sequence number is greater than the second sequence number or by using the second base block copy if the second sequence number is greater than the first sequence number.

9. The method as claimed in claim 8 wherein the memory performs write operations; and defining a memory location of a data structure within a plurality of base block copies includes updating the first base block copy and the second base block copy prior to a write operation.

10. The method as claimed in claim 8 wherein defining a memory location of a data structure includes differentiating which of the plurality of base block copies has the most recent data.

11. The method as claimed in claim 8 wherein defining a memory location of a data structure includes selecting each of the plurality of base block copies so at most one of the plurality of base block copies can be corrupted.

12. The method as claimed in claim 8 wherein: the data structure has an intended state; and rebuilding the location of the data structure includes using one or more of the plurality of base block copies to rebuild the intended state of the data structure after corruption of one of the plurality of base block copies.

13. The method as claimed in claim 8 wherein the data structure includes pointers to other data structures selected from a group consisting of remap information, wear-leveling tables, configuration data, recovery information, and a combination thereof.

14. The method as claimed in claim 8 wherein the memory includes pre-erased recovery blocks; and defining a memory location of a data structure includes writing the plurality of base block copies to the pre-erased recovery blocks.

15. A method for recovering data in a non-volatile memory comprising:
providing a first base block copy having a first sequence number, a first copy pointer and a first checksum;
providing a second base block copy having a second sequence number, a second copy pointer and a second checksum;
defining in the non-volatile memory a location of a data structure in at least two base block copies, including the first base block copy and the second base block copy, by storing a first pointer in the first base block copy and a second pointer in the second base block copy, the first pointer and the second pointer each identifying the location of the first data structure, and by setting the first sequence number to represent the number of times the first pointer has been updated successfully in the first base block copy and setting the second sequence number to represent the number of times the second pointer has been has been updated successfully in the second base block copy; and
rebuilding the location of the data structure by using the first base block copy if the first sequence number is greater than the second sequence number or by using the second base block copy if the second sequence number is greater than the first sequence number.

16. The method as claimed in claim 15 wherein the non-volatile memory performs write operations; and the base block copies are updated prior to a write operation.

17. The method as claimed in claim 15 wherein rebuilding the location of the data structure includes differentiating which base block copy has the most recent data.

18. The method as claimed in claim 15 wherein defining the location of the data structure includes selecting each of the base block copies so at most one can be corrupted.

19. The method as claimed in claim 15 wherein: the non-volatile memory has an intended state; and at least one of the base block copies can be used to rebuild the intended state of the non-volatile memory before corruption thereof.

20. The method as claimed in claim 15 wherein the data structure includes pointers to other data structures selected from a group consisting of remap information, wear-leveling tables, configuration data, recovery information, and a combination thereof.

21. The method as claimed in claim 15 wherein the non-volatile memory includes pre-erased recovery blocks; and the base block copies are written to pre-erased recovery blocks.

22. The method as claimed in claim 1, wherein defining in the storage device information related to the first data structure within a plurality of copies of a second data structure includes associating a memory address to the first data structure.

23. The method as claimed in claim 22, wherein defining in the storage device information related to the first data structure within a plurality of copies of a second data structure includes creating a first base block copy and a second base block copy.

24. The method in claim 1, wherein the defining of the storage device information includes storing a first pointer in the first base block copy and a second pointer in the second base block copy, the first pointer and second pointer for identifying the location of the first data structure.

25. The method in claim 24, further including setting the first copy pointer to point to the location of the second base block copy.

26. The method in claim 24, further including: setting the second copy pointer to point to the location of the first base block copy.

27. The method in claim 24, further including: setting the first sequence number to represent the number of times the first base block copy has been updated successfully.

28. The method in claim 24, further including: setting the second sequence number to represent the number of times the second base block copy has been updated successfully.

29. The method in claim 24, further including: setting the first sequence number to represent the number of times the first pointer has been updated successfully.

30. The method in claim 24, further including: setting the first sequence number to represent the number of times the first pointer has been updated successfully.

31. The method in claim 24, further including: providing an original base block copy, the original base block copy having an original checksum which is compared with the first checksum, and if the original checksum and first checksum match, using the first copy pointer to locate the second base block copy.

* * * * *